US012358614B2

(12) United States Patent
Ferrazzano et al.

(10) Patent No.: US 12,358,614 B2
(45) Date of Patent: Jul. 15, 2025

(54) AXLE SLEEVE

(71) Applicant: Airbus Operations Limited, Bristol (GB)

(72) Inventors: Luca Ferrazzano, Bristol (GB); James Leather, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 260 days.

(21) Appl. No.: 17/709,589

(22) Filed: Mar. 31, 2022

(65) Prior Publication Data
US 2022/0315210 A1 Oct. 6, 2022

(30) Foreign Application Priority Data

Mar. 31, 2021 (GB) ...................... 2104597

(51) Int. Cl.
B64C 25/36 (2006.01)
B60B 35/04 (2006.01)
B64C 25/42 (2006.01)

(52) U.S. Cl.
CPC .............. B64C 25/36 (2013.01); B60B 35/04 (2013.01); B64C 25/42 (2013.01)

(58) Field of Classification Search
CPC .................................................... B64C 25/36
See application file for complete search history.

(56) References Cited

U.S. PATENT DOCUMENTS

| | | | | | |
|---|---|---|---|---|---|
| 3,008,779 | A | * | 11/1961 | Spriggs | F16C 33/20 384/299 |
| 3,707,270 | A | * | 12/1972 | Laimins | G01G 19/07 73/781 |
| 6,180,574 | B1 | * | 1/2001 | Ryan | C09D 4/00 427/372.2 |
| 2011/0262059 | A1 | * | 10/2011 | Karaki | F16C 33/208 384/13 |
| 2016/0297516 | A1 | * | 10/2016 | Ganis | B64C 25/36 |

FOREIGN PATENT DOCUMENTS

| | | | |
|---|---|---|---|
| CN | 202597472 U | * | 12/2012 |
| CN | 103398091 A | | 11/2013 |

OTHER PUBLICATIONS

Combined Search and Examination Report for GB2104597.6, dated Sep. 21, 2021, 4 pages.
Examination Report cited in EP 22162791.2 mailed Feb. 12, 2024, 4 pages.

* cited by examiner

Primary Examiner — Michael H Wang
(74) Attorney, Agent, or Firm — Nixon & Vanderhye P.C.

(57) ABSTRACT

In a wheeled landing gear of an aircraft, an axle sleeve 10 that includes a low friction wear surface 19 on a portion of an internal surface of the axle sleeve. The low friction wear surface 19 includes a ring 20 of composite material including fibres in a polymer matrix.

19 Claims, 4 Drawing Sheets

AXLE SLEEVE

RELATED APPLICATION

This application incorporates by reference and claims priority to United Kingdom patent application GB 2104597.6, filed Mar. 31, 2021.

FIELD OF TECHNOLOGY

This invention relates to a sleeve for an axle, such as the axle of an aircraft landing gear assembly. The invention also relates to an axle assembly; an aircraft landing gear assembly; and an aircraft, all including such a sleeve. The invention further relates to a method of making such a sleeve.

BACKGROUND

The landing gear of an aircraft supports the craft when it is on the ground, allowing it to take off, land and taxi. Wheeled landing gear is the most common, and so landing gear assemblies conventionally include an axle on which a set of wheels is rotatably mounted. The axle may also support part of the braking assembly for the wheels of the landing gear. Over a period of time of operation in service, the tires of the wheel assemblies and the brakes are subject to wear and tear and so need to be removed for maintenance or to be replaced. During such removal and replacement of these components, the axle may become damaged. The axle is a heavy, load-bearing component, typically made of forged steel. If the axle becomes damaged, it is very difficult, time-consuming and costly to change it. Therefore, a protective sleeve for the axle may be provided. The sleeve is more easily replaced when damaged than the entire axle and so is considered to be a consumable element of the landing gear assembly.

As mentioned above, landing gear assemblies typically also include braking assemblies that comprise a combination of rotating and stationary components. During braking, the airplane antiskid system modulates the torque application to the brake pack in order to prevent tire skidding and damage, and to maximize braking efficiency on all ground/runway conditions. The torque variation and the subsequent rotational speed variation of the associated wheel can induce a correspondent rotational oscillation of the axle sleeve on the axle. Such oscillations and flexing of the axle under load can cause the axle and sleeve to rub together, elevating the temperature in this region and causing heat damage and/or wear to the axle, to the sleeve, or to both. This fretting results in the sleeve needing to be replaced more frequently, which is costly and inconvenient.

It has been proposed to reduce the damage cause by fretting by providing a lubricant at the interface between the sleeve and the axle. However, the vibrations and heating produced by the braking system cause such lubricants to dissipate so that the lubricant needs to be reapplied regularly. This is an additional maintenance burden.

It has also been proposed to prevent fretting by increasing the separation between the sleeve and the axle in the region near the braking system. However, because of the arrangement and proximity of the other components of the braking system and landing gear, it has been difficult to provide this extra spacing.

BRIEF SUMMARY OF THE TECHNOLOGY

The invention provides an aircraft landing gear axle sleeve having a low friction wear surface comprising a ring of composite material on a portion of a surface of the sleeve. The low friction wear surface allows the sleeve to move relative to other components, such as the axle, without causing wear or heat damage to the sleeve or other components.

The composite material may comprise fibres in a polymer matrix, such as polytetrafluoroethylene.

The fibres may comprise a selection of: glass; carbon; Kevlar; basalt; polytetrafluoroethylene (PTFE); cotton; wood; and/or paper.

The low friction wear surface may be on an internal surface of the sleeve, at a location arranged, in use, to interface with the axle or with another component of the landing gear assembly, such as part of the braking assembly.

The low friction wear surface may be arranged to stand proud of the internal surface, so that it is interposed between the sleeve and the axle.

A plurality of low friction wear surfaces in the form of rings of composite material may be provided on different respective portions of the surface of the sleeve. This may be the internal surface, the external surface, or a combination of the two.

The invention further provides a method of making an aircraft landing gear axle sleeve comprising the steps of: forming a low friction wear surface; and bonding the low friction wear surface to a surface of the sleeve.

The step of forming the low friction wear surface may comprise making a ring of composite material comprising fibres in a polymer matrix. This step may comprise making a fibre preform and then introducing the polymer matrix.

The step of bonding the low friction wear surface may comprise curing the low friction wear surface in situ on the surface of the sleeve. The low friction wear surface may then be machined to predetermined dimensions.

The invention further provides an aircraft landing gear axle assembly comprising an axle and the sleeve of the present invention, disposed circumferentially around the axle.

The coefficient of friction between the low friction wear surface and the axle may be less than the coefficient of friction between the internal surface of the sleeve and the axle. The coefficient of friction ($\mu$) between the low friction wear surface and the axle is less than 0.4.

The invention further provides an aircraft landing gear assembly comprising an axle assembly of the present invention.

The aircraft landing gear assembly may comprise a strut supported by a pair of such axle assemblies. Several pairs of axle assemblies may be provided.

A braking system may also be provided, with the sleeve being arranged so that a low friction wear surface is at an end portion of the sleeve adjacent part of the braking system.

The invention further comprises an aircraft comprising at least one aircraft landing gear assembly of the present invention.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1:
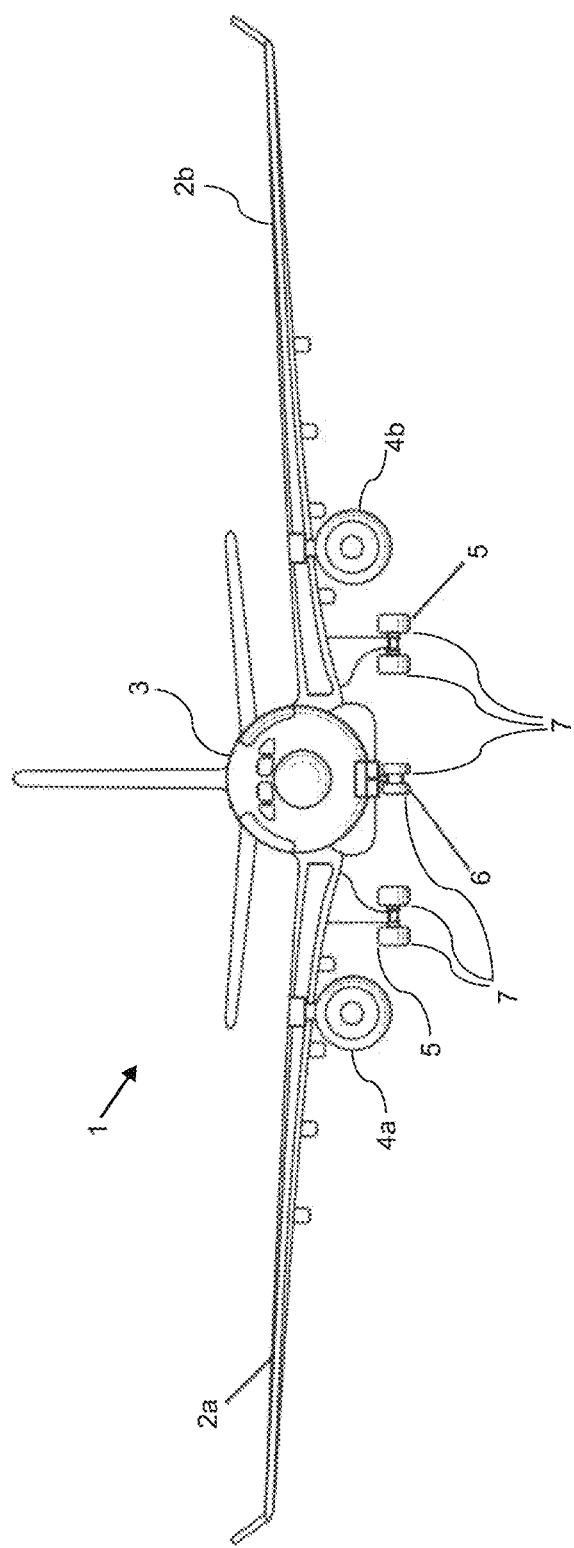
FIG. 1 is a front view of an aircraft.

In examples described herein, references to "aircraft" include all kinds of aircraft, such as fixed wing military or commercial aircraft; unmanned aerial vehicles (UAVs); and rotary wing aircraft, such as helicopters.

The components shown in the drawings are not necessarily shown to scale.

With reference to FIG. 1, an aircraft indicated generally by the reference numeral 1 comprises a pair of wings 2a, 2b and a fuselage 3. The wings 2a, 2b each carry an engine 4a, 4b respectively. The aircraft 1 in this example is supported on the ground by sets of landing gear assemblies comprising a main landing gear (MLG) 5 and a nose landing gear (NLG) 6. The landing gear assemblies comprise pairs of wheel assemblies 7 which are shown in FIG. 1 in contact with the ground (e.g. a runway). This aircraft has six wheel assemblies in total; four wheel assemblies as part of the MLG 5 and two wheel assemblies as part of the nose landing gear NLG 6. Of course, other undercarriage arrangements having any number of single-wheel units or bogies composed of multiple wheels may be provided.

Figure 2:
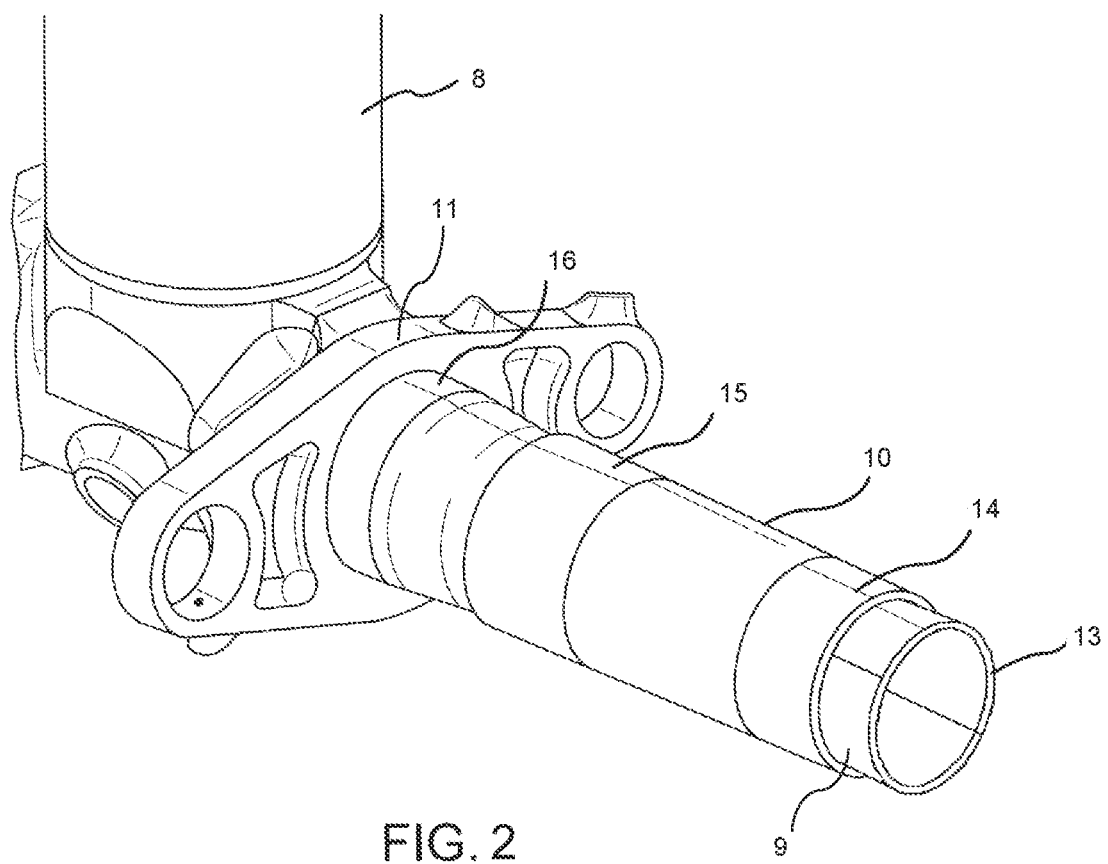
FIG. 2 is a perspective view of part of the landing gear of the aircraft of FIG. 1 including an axle sleeve constructed according to the invention.

Part of one of the landing gear assemblies of FIG. 1 is shown in the simplified drawing of FIG. 2. In this drawing, only the main support strut 8 and one of the axles 9 of the landing gear assembly is shown. Another axle (not shown) is also provided, and extends from the other side of the main support strut 8. Together the axles support the wheel assembly 7 of the landing gear assembly. Each landing gear axle 9 is provided with a protective sleeve 10. The sleeve 10 is formed from a tube of steel, typically one piece, and has a shape arranged to correspond to the dimensions of the axle 9. The sleeve 10 is arranged to protect the axle 9 and the wheel assembly 7 in use.

Figure 3A:
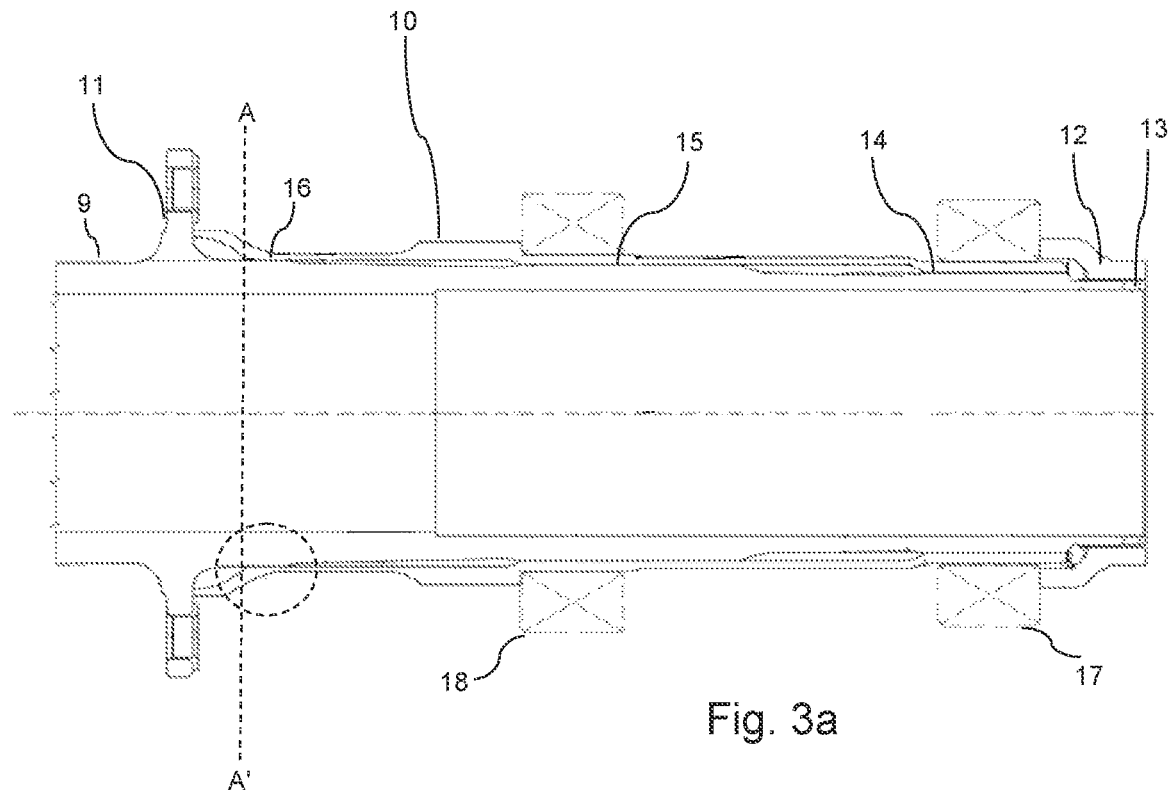
FIG. 3a is a cross sectional view of the axle of FIG. 2 along its longitudinal axis.
Figure 3B:
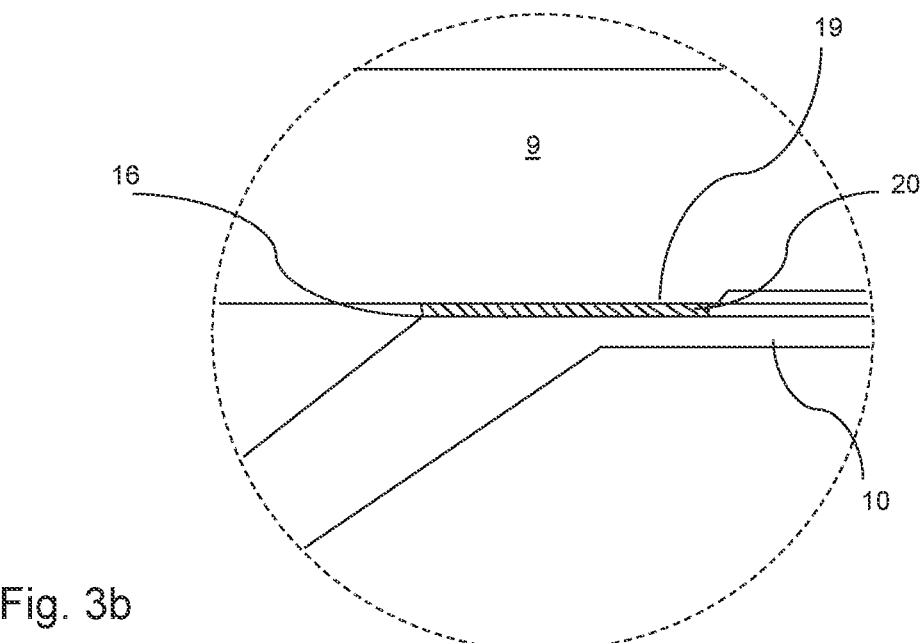
FIG. 3b is an enlarged view of the portion of FIG. 3a circled by a broken line.

With reference now to FIGS. 2, 3a and 3b, the sleeve 10 comprises a plurality of regions arranged to engage with different components of the landing gear. For example, the inboard end of the sleeve 10 (i.e. the end portion of the sleeve nearer the strut 8 in use) is arranged to abut a flange 11. The static parts of the aircraft braking system (not shown in these drawings) are typically bolted to this flange 11. The outboard end of the sleeve 10 (i.e. the end portion of the sleeve further from the strut 8 in use) is held by a nut 12 coupled to the tip 13 of the axle. The nut 12 is arranged to retain the entire wheel assembly 7 in place on the axle 9.

The axle assembly also comprises a plurality of journals 14, 15, 16, at regions where the axle 9 and the sleeve 10 are in contact. The outer journal 14 comprises a section of sleeve 10 that receives an outer portion of a wheel assembly, such as an outer wheel bearing 17. The middle journal 15 comprises a section of the sleeve 10 that receives an inner portion of the wheel assembly, such as an inner wheel bearing 18.

Figure 4:
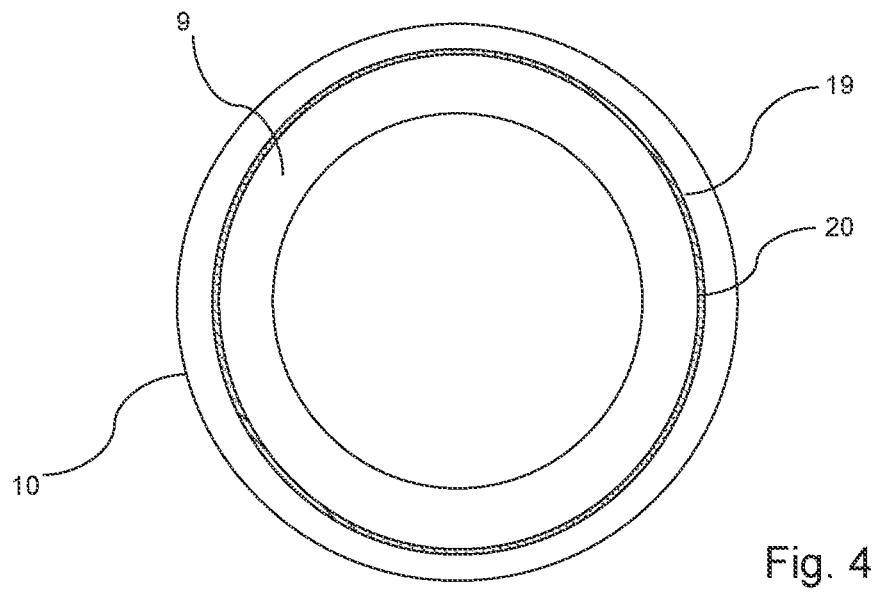
FIG. 4 is a cross-sectional view of the axle and sleeve of FIGS. 2, 3a and 3b along the broken line A-A'.

The inner journal 16 is the innermost region of the sleeve 10 that contacts the axle 9. It is this portion of the sleeve 10 that is most susceptible to fretting caused by vibrations of the braking system and flexing of the axle 9 against the sleeve. In accordance with the invention, this inboard region of the sleeve 10 includes a low friction wear surface 19 attached to the internal surface of the sleeve 10. The low-friction wear surface 19 is interposed between the axle 9 and the main body of the sleeve 10 and is visible in the enlarged drawing of FIG. 3b and also in the sectional drawing of FIG. 4.

The low friction wear surface 19 comprises a ring 20 formed of a composite material comprising fibres in a polymer matrix. The ring 20 has a thickness (in the radial direction) of less than a millimetre: a typical value for this application would be around 0.3 mm. The ring 20 is formed of a circular wall that extends (in the axial direction) a few centimetres, typically around 3.5 cm. The low friction wear surface 19 that comprises the interface between the ring 20 and the axle 9 has a low coefficient of friction ($\mu$) due to the polymer matrix, typically less than 0.4. The coefficient of friction ($\mu$) between the sleeve and the axle may be determined by the choice of fibres and the fraction of fibres in the matrix; its value may be as low as 0.03.

The fibres in the ring 20 provide strength and durability to increase the lifetime of the low friction wear surface 19. In this embodiment, the ring is formed of a composite material that comprises fibres in a matrix of polytetrafluoroethylene (PTFE). The fibres may be of any suitable material, such as glass, carbon, Kevlar, basalt or even PTFE yarn. A combination of any of these fibres may be used.

In use, the low friction wear surface 19 allows the axle and the sleeve to flex, slide and rotate relative to each other. The sleeve can also better tolerate vibrations cause by the braking system. The ring 20 of composite material is also able to withstand the extremes of temperature experienced by the landing gear assembly in use. Furthermore, the ring 20 is lightweight, such that it will not affect the balance of the landing gear assembly.

Over time, the movement of the ring 20 against the axle will cause the ring to wear away gradually. Such a low impact degradation does not cause damage to other components of the landing gear assembly. The ring 20 is a sacrificial element of the landing gear assembly. When it has worn away, the sleeve 10 may be replaced during servicing with a sleeve having a new composite ring 20 on its inner surface.

Figure 5:
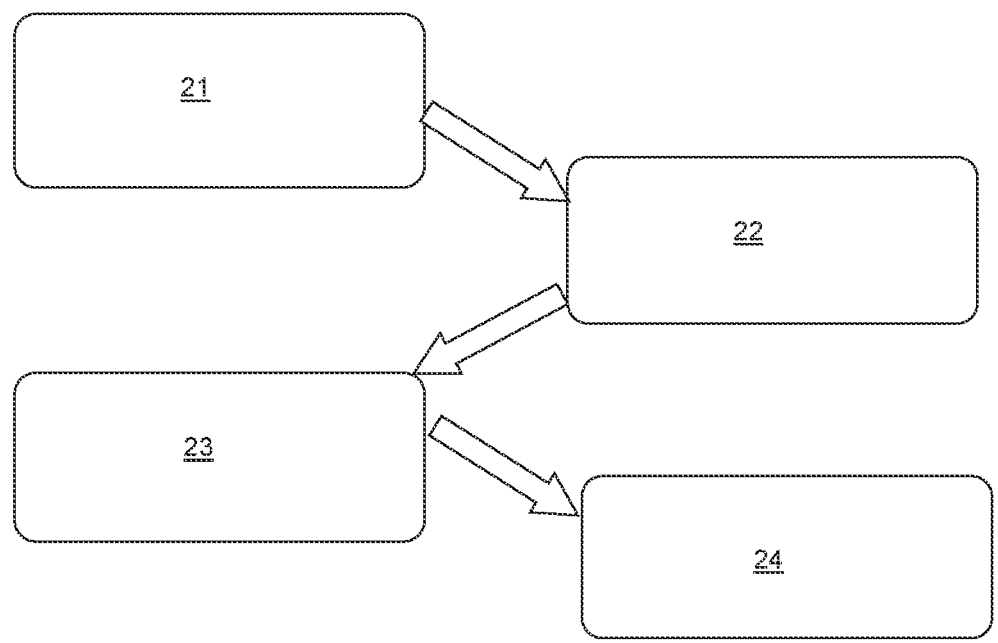
FIG. 5 is a flow chart of a method of making the axle sleeve of FIGS. 2 to 4.

FIG. 5 is a flow chart illustrating an example method of manufacturing an axle sleeve constructed according to the invention.

The first step 21 comprises making a fibre preform. This can be done by braiding, weaving or knitting fibres to form fabric layers of the desired shape and dimensions. Alternatively, non-woven mats of chopped fibre may be cut to shape. The fibre preform is then laid in a mould that has the same dimensions as the sleeve 10. Alternatively, the fibre preform can be wound on a tubular mandrel that has an external diameter slightly smaller than the internal diameter of the sleeve 10, for example 1 mm smaller.

Once the preform has been stabilised, the next step 22 comprises infusing the preform with a liquid polymer. This can be done by any suitable method known to the skilled person, such as injection moulding; resin transfer moulding; or cold pressing and sintering.

The third step 23 comprises curing the composite ring 20. This is done in situ inside the sleeve 10. The ring 20 is put into position in the desired location inside the sleeve 10. In the embodiment shown in FIGS. 3a, 3b and 4, the ring 20 is held at the end portion of the sleeve that, in use, corresponds to the inboard portion of the sleeve. The ring 20 is then heated to a predetermined curing temperature. This temperature is sustained for a predetermined time until the cure is complete. Pressure may also be applied to consolidate the ring 20 on the interior of the sleeve 10. The sleeve 10 and ring 20 are then cooled in a controlled fashion.

The final step 24 is that of machining by milling, routing, sanding, or any combination of these processes. The ring 20 can be machined to the desired dimensions, so that it stands proud of the inner surface of the sleeve 10 by a predetermined desired amount; as mentioned above, this is typically a fraction of a millimetre. Compressed air may be applied during this process to remove the swarf.

Variations may be made without departing from the scope of the invention. For example, the shape of the sleeve need not be a cylindrical tube of constant diameter. The sleeve may comprise a conic section, or may have different shapes in different respective regions of the sleeve.

Other polymers may be utilised for the matrix, such as epoxy resin or polyetheretherketone (PEEK). A combination of polymers may be employed. Mineral fillers, such as silicates, may be used in the matrix material. The invention may be made more sustainable by utilising natural fibres, such as cotton, wood or paper, to make the fibre pre-form of the composite material.

As an alternative to the ring 20 being cured onto to the inner surface of the sleeve, a seat may be cut into the inner surface of the sleeve 10, and the ring may be bonded into the seat. This may hold the ring more securely. The ring 20 may be designed to fit against the sleeve, or against a seat in the sleeve, as a snap-fit. Alternatively, the ring may fit against the sleeve as an interference fit—either against the sleeve itself or in a corresponding groove in the sleeve.

The location of the ring 20 is not limited to the position shown in the drawings. A ring 20 may alternatively or additionally be provided at the interface between the outer journal 14 and the axle 9, and/or the interface between the middle journal 15 and the axle. A ring 20 may also be provided at the inboard end of the sleeve 10, for example at flange 11, in order to protect the sleeve from damage at the interface with components of the braking assembly. Each ring need not be of the same composition: different fibres, polymers or fibre fractions may be utilised in dependence on the coefficient of friction and wear properties desired at the interface between the sleeve and the component.

As a further alternative, a ring 20 may be provided over part of the external surface of the sleeve 10 to prevent damage caused by contact with other components of the landing gear assembly, for example the brake. Further variations will be apparent to the skilled person.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft landing gear axle assembly comprising:
    an axle including an annular flange configured to support a braking component,
    a sleeve disposed circumferentially around the axle, and
    a sacrificial wear ring disposed circumferentially around and on an inner surface of the sleeve, wherein the sacrificial wear ring is formed of a composite material and forms a low friction wear surface abutting the axle,
    wherein the sleeve extends axially parallel to an axis of the axle and along a length of the axle extending from the annular flange towards an end of the axle opposite to the annular flange,
    wherein the sleeve includes a first portion radially aligned with wheel bearings mounted to the sleeve and the axle;
    wherein the first portion extends through and between the wheel bearings,
    wherein the sleeve includes a second portion extending in the direction of the axis from the first portion towards the annular flange,
    wherein the sleeve is continuous through the first portion and the second portion;
    wherein the second portion does not support an external load applied directly to the second portion along a direction extending radially from the axle, and
    wherein the sacrificial ring is on the second portion of the sleeve and the sacrificial ring is spaced apart from the first portion.

2. The aircraft landing gear axle assembly as in claim 1, in which the composite material comprises fibers in a polymer matrix.

3. The aircraft landing gear axle assembly as in claim 2, in which the polymer matrix comprises polytetrafluoroethylene.

4. The aircraft landing gear axle assembly as in claim 2, in which the fibers comprise a selection of: glass; carbon; Kevlar; basalt; polytetrafluoroethylene; cotton; wood; and/or paper.

5. The sleeve as in claim 1, in which the low friction wear surface stands proud of the internal surface.

6. The aircraft landing gear axle assembly as in claim 1, wherein the sacrificial wear ring is one of a plurality of sacrificial wear rings on the internal surface of the sleeve, each of the sacrificial wear rings is formed of a low friction composite material and the sacrificial wear rings are arranged on different respective portions of the surface of the sleeve spaced apart along a direction of an axis of the axle.

7. A method of making an aircraft landing gear axle assembly comprising:
    forming a sacrificial wear ring of a low-friction composite material;
    bonding the sacrificial wear ring to an inner surface of a sleeve, wherein the sacrificial wear ring is formed of a composite material and forms a low friction wear surface abutting the axle;
    providing an axle for the aircraft landing gear assembly, and
    positioning the sleeve circumferentially around the axle such that the sacrificial wear ring abuts an annular surface of the axle, wherein the sleeve extends axially parallel to an axis of the axle and along a length of the axle extending along the axle away from the annular flange,
    mounting wheel bearings on a first portion of the sleeve such that the wheel bearings are mounted to the sleeve and the axle;
    wherein the sleeve includes a second portion extending in the direction of the axis from the first portion towards the annular flange,
    wherein the sleeve extends continuously through the first portion and the second portion;

wherein the second portion does not support an external load applied directly to the second portion by the wheel bearings along a direction extending radially from the axle, and wherein the sacrificial ring is on the second portion of the sleeve and the sacrificial ring is spaced apart from the first portion.

8. The method as in claim 7, in which the forming of the sacrificial wear ring comprises making the sacrificial wear ring of the composite material from fibers in a polymer matrix.

9. The method as in claim 8, in which the making of the sacrificial wear ring comprises making a fiber preform of the sacrificial wear ring and introducing the polymer matrix into the fiber preform.

10. The method as in claim 7, which the bonding of the sacrificial wear ring comprises curing the sacrificial wear ring in situ on the inner surface of the sleeve.

11. The method as in claim 7, further comprising machining the sacrificial wear ring to predetermined dimensions.

12. The method of claim 7, wherein the step of positioning includes positioning the sacrificial wear ring entirely between the inner surface of the sleeve and the annular surface of the axle.

13. An aircraft landing gear axle assembly comprising:
an axle with an axis,
a sleeve disposed circumferentially around the axle, and
a sacrificial wear ring formed of a low-friction composite material on a portion of an inner surface of the sleeve abutting the axle,
wherein the sleeve extends parallel to the axis of the axle and along a length of the axle between an annular flange on the axle configured to support braking components and a nut on an end of the axle,
wherein the sleeve includes a first portion radially aligned with wheel bearings mounted to the sleeve and axle and extending between the wheel bearings,
wherein the sleeve includes a second portion extending axially between the first portion and the annular flange,
wherein the sleeve extends continuously through the first portion and the second portion;
wherein the second portion does not support an external load applied directly to the second section along a direction extending radially from the axle, and
wherein the sacrificial wear ring is on second portion of the sleeve and the sacrificial wear ring is spaced apart from the first portion along an axis of the axle.

14. The aircraft landing gear axle assembly as in claim 13, in which a first coefficient of friction between the sacrificial wear ring and the axle is less than a second coefficient of friction between the internal surface of the sleeve and the axle.

15. The aircraft landing gear axle assembly as in claim 14, in which the first coefficient of friction between the sacrificial wear ring and the axle is less than 0.4.

16. An aircraft landing gear assembly comprising the aircraft landing axle assembly as in claim 13.

17. The aircraft landing gear assembly as in claim 16, further comprising a braking system, wherein the sleeve is arranged so that the sacrificial wear ring is at an end portion of the sleeve adjacent part of the braking system.

18. An aircraft comprising at least one aircraft landing gear assembly as in claim 16.

19. An aircraft landing gear assembly comprising a strut supported by a pair of aircraft landing gear axle assemblies, wherein each of the aircraft landing gear axle assemblies is the aircraft landing gear axle assembly as in claim 13.

* * * * *